(12) United States Patent
Schmauder

(10) Patent No.: US 8,814,770 B2
(45) Date of Patent: Aug. 26, 2014

(54) LASER NOZZLE CHANGING DEVICE

(71) Applicant: TRUMPF Werkzeugmaschinen GmbH + Co. KG, Ditzingen (DE)

(72) Inventor: Frank Schmauder, Metzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 71 days.

(21) Appl. No.: 13/718,161

(22) Filed: Dec. 18, 2012

(65) Prior Publication Data

US 2013/0105452 A1 May 2, 2013

Related U.S. Application Data

(62) Division of application No. 12/352,187, filed on Jan. 12, 2009, now Pat. No. 8,366,593.

(30) Foreign Application Priority Data

Jan. 12, 2008 (EP) .................................... 08000523

(51) Int. Cl.
*B23Q 3/157* (2006.01)
(52) U.S. Cl.
USPC .................... 483/58; 483/48; 483/61; 483/67
(58) Field of Classification Search
CPC ...... B23Q 1/015; B23Q 1/25; B23Q 3/15706; B23Q 3/15786; B23Q 3/1571; B23Q 3/15773; B23Q 3/155; B23Q 3/15513; B23Q 3/15506; B23Q 3/1552; B23Q 3/15526
USPC ....................... 483/10, 23, 27, 48, 58, 61, 67; 219/121.84
See application file for complete search history.

(56) References Cited

U.S. PATENT DOCUMENTS

| | | | |
|---|---|---|---|
| 6,494,821 B1 * | 12/2002 | Patel et al. | 483/49 |
| 6,716,146 B2 | 4/2004 | Kato | |
| 7,367,930 B2 * | 5/2008 | Yamazaki et al. | 483/16 |
| 2008/0058187 A1 | 3/2008 | Yamazaki et al. | |

FOREIGN PATENT DOCUMENTS

| | | |
|---|---|---|
| CN | 2908021 | 6/2007 |
| DE | 10056330 | 3/2002 |
| DE | 102006028730 | 7/2007 |
| EP | 1057582 | 12/2000 |

(Continued)

OTHER PUBLICATIONS

English translation of the First Office Action for corresponding Chinese Application No. 2009100020417, issued Jul. 2, 2012, 10 pages.

*Primary Examiner* — Alexander P Taousakis
(74) *Attorney, Agent, or Firm* — Fish & Richardson P.C.

(57) ABSTRACT

A method for processing workpieces with a laser processing machine including a laser processing head having a nozzle receiving member configured to receive a laser nozzle. The method includes holding a workpiece on a workpiece support plane of a workpiece support, transferring a laser nozzle between a nozzle magazine of a nozzle changing device located at a first side of the workpiece support and a nozzle receiving member of the laser processing head located at a second side of the workpiece support such that the laser nozzle is assembled on or disassembled from the nozzle receiving member, and moving the laser nozzle through a through-opening defined in the workpiece support along a transverse direction to the workpiece support.

9 Claims, 15 Drawing Sheets

(56) References Cited

FOREIGN PATENT DOCUMENTS

| | | |
|---|---|---|
| EP | 1454698 | 9/2004 |
| EP | 1602438 | 12/2005 |
| EP | 1602439 | 12/2005 |
| FR | 2547230 | 12/1984 |
| JP | 58192731 | 11/1983 |
| JP | 60056841 | 4/1985 |
| JP | 6023580 | 2/1994 |
| JP | 2005334921 A | 12/2005 |

* cited by examiner

LASER NOZZLE CHANGING DEVICE

CROSS REFERENCE TO RELATED APPLICATIONS

This application is a divisional of U.S. application Ser. No. 12/352,187, filed Jan. 12, 2009, which claims priority under 35 U.S.C.§119(a) to European Application No. 08 000 523.4, filed on Jan. 12, 2008, the entire contents of which are hereby incorporated by reference.

TECHNICAL FIELD

The invention relates to a laser processing machine having a nozzle changing device.

BACKGROUND

JP 06 023580 A discloses a laser processing machine in which a nozzle changing device having a plurality of storage locations each for one laser nozzle is fitted to the upper side of a workpiece table facing a laser processing head. In order to avoid impeding the laser processing operation, the nozzle changing device is arranged outside the operating region of the laser processing head. In order to change a nozzle, either the laser processing head moves towards the nozzle changing device, or the nozzle changing device is moved towards the laser processing head by the workpiece table being moved.

EP 1 602 439 A2 discloses a nozzle changing device that is arranged, as part of a fitting station, beside a workpiece support or at the edge of a workpiece support. In both cases, the laser processing head of the machine travels a relatively long distance to a tool or nozzle changing position in order to change a nozzle.

SUMMARY

In one general aspect, a laser processing machine for processing workpieces includes a laser processing head having a nozzle receiving member configured to receive a laser nozzle; a workpiece support configured to hold workpieces on a workpiece support plane; and a nozzle changing device comprising a nozzle magazine having at least one nozzle storage location for a laser nozzle and being arranged at a side of the workpiece support plane that is remote from a side that faces the laser processing head. The nozzle changing device is configured to assemble a laser nozzle on or to disassemble a laser nozzle from the nozzle receiving member of the laser processing head. The workpiece support defines a through-opening through which a laser nozzle can be moved in a transverse direction to the workpiece support plane such that the laser nozzle is transferred between the nozzle magazine of the nozzle changing device and the nozzle receiving member of the laser processing head.

Implementations can include one or more of the following features. For example, the nozzle changing device can include a handling device, by means of which a laser nozzle can be transferred between the nozzle magazine of the nozzle changing device and the nozzle receiving member of the laser processing head.

The workpiece support and the laser processing head can be configured to be moved relative to each other, and the nozzle changing device can be configured to be moved relative to the laser processing head into one or more of a changing position and a park position by means of a relative movement between the workpiece support and the laser processing head.

The workpiece support and the nozzle changing device can be configured to be jointly moved relative to the laser processing head such that the nozzle changing device can be moved into one or more of a changing position and a park position relative to the laser processing head by the movement of the workpiece support.

The nozzle changing device can be configured to be moved into one or more of a changing position and a park position by a support drive of the workpiece support, by means of which the workpiece support can be moved relative to the laser processing head together with a device for discharging products of the workpiece processing operation.

The nozzle changing device can be connected to the workpiece support. The nozzle changing device can be configured to be moved relative to the workpiece support.

The nozzle changing device can include a handling device that is configured to transfer a laser nozzle in a transverse direction to the workpiece support plane between the nozzle magazine of the nozzle changing device and the nozzle receiving member of the laser processing head. The handling device can be configured to transfer a laser nozzle through the workpiece support plane between the nozzle magazine of the nozzle changing device and the nozzle receiving member of the laser processing head.

In another general aspect, workpieces are processed with a laser processing machine including a laser processing head having a nozzle receiving member configured to receive a laser nozzle. The method includes holding a workpiece on a workpiece support plane of a workpiece support; transferring a laser nozzle between a nozzle magazine of a nozzle changing device located at a first side of the workpiece support and a nozzle receiving member of the laser processing head located at a second side of the workpiece support such that the laser nozzle is assembled on or disassembled from the nozzle receiving member; and moving the laser nozzle through a through-opening defined in the workpiece support along a transverse direction to the workpiece support. Implementations can include one or more of the following features. For example, the laser nozzle can be transferred between the nozzle magazine of the nozzle changing device and the nozzle receiving member of the laser processing head.

The workpiece support and the laser processing head can be moved relative to each other; and the nozzle changing device can be moved relative to the laser processing head into one or more of a changing position and a park position by means of a relative movement between the workpiece support and the laser processing head.

The workpiece support and the nozzle changing device can be jointly moved relative to the laser processing head such that the nozzle changing device is moved into one or more of a changing position and a park position relative to the laser processing head by the movement of the workpiece support.

The nozzle changing device can be moved into one or more of a changing position and a park position by a support drive of the workpiece support, by means of which the workpiece support can be moved relative to the laser processing head together with a device for discharging products of the workpiece processing operation.

The nozzle changing device can be connected to the workpiece support. The nozzle changing device can be moved relative to the workpiece support.

The laser nozzle can be transferred along a transverse direction to the workpiece support plane between the nozzle magazine of the nozzle changing device and the nozzle receiving member of the laser processing head.

The laser nozzle can be transferred through the workpiece support plane between the nozzle magazine of the nozzle changing device and the nozzle receiving member of the laser processing head.

The nozzle changing device is more fully integrated into the laser processing machine.

The nozzle changing device is arranged at the lower side of the workpiece support plane defined by the workpiece support. Owing to this arrangement, the nozzle changing device does not produce a contour that interferes with normal machine operation, that is to say, during workpiece processing by means of the laser processing head. In this way, the nozzle changing device can permanently remain near the laser processing head. The nozzle changing device is integrated in the functional center of the laser processing machine. If the laser processing head and the nozzle changing device have to carry out any relative movement in order to change a nozzle, only short paths have to be traveled. The nozzle changing device is further protected, at the lower side of the workpiece support plane, against damaging influences, for example, against contamination and undesirable mechanical loads.

Owing to the arrangement of the nozzle changing device below the workpiece support plane, particular measures are taken to produce the spatial proximity of the laser processing head and the nozzle changing device necessary for changing a nozzle. It is conceivable for the laser processing head to be movable, which allows the laser processing head and the nozzle changing device to be moved, simply by the laser processing head being moved, into a relative position in which it is possible to carry out a change of a nozzle.

The nozzle changing device can also include, in addition to a nozzle magazine, a handling device by means of which a laser nozzle can be transferred between the nozzle magazine of the nozzle changing device and the nozzle receiving member of the laser processing head and which laser nozzle can further also be assembled on or disassembled from the nozzle receiving member.

Additional use is made of movement capabilities that are provided for in any case in laser processing machines in order to move the nozzle changing device and the laser processing head relative to each other into a changing position and/or into a park position. Generally, the nozzle changing device is arranged near the processing head when the changing position is taken up and is positioned farther away from the laser processing head in the park position. If the park position is taken up during normal machine operation, the nozzle changing device is substantially protected in the park position against damaging influences deriving from the processing operation, for example, against slag and material splashes when metal sheets are cut by laser.

A relative movement of the workpiece support and the laser processing head can be brought about in various manners. The workpiece support can be moved relative to the laser processing head. The nozzle changing device is connected to the workpiece support in terms of movement and can be moved into a changing position and/or into a park position by the workpiece support being moved. A drive that is provided in any case for the workpiece support can also be used as a drive for the nozzle changing device.

The drive of the workpiece support that is used at the same time as the drive for the nozzle changing device can serve various purposes. The laser processing machine can include a drive to be used to drive the nozzle changing device, which is otherwise used to move the workpiece support, together with a device for discharging products of the workpiece processing operation relative to the laser processing head. In such a discharge device, this may involve, for example, a flap that closes a discharge opening of the machine during the workpiece processing operation and that, in accordance with the size of the component to be discharged, is moved into various positions by the workpiece support being moved and associated movement relative to the laser processing head.

A connection between the nozzle changing device and the workpiece support in terms of movement is brought about particularly simply if the nozzle changing device is connected to the workpiece support.

The nozzle changing device can be moved relative to the workpiece support. Such movability of the nozzle changing device is particularly advantageous when a relative movement of the workpiece support and the laser processing head is insufficient to transfer the nozzle changing device to a desired position, for example, to a changing position or a park position. In those cases, the positioning movement of the nozzle changing device is brought about partially by a relative movement of the workpiece support and the laser processing head and partially by a movement of the nozzle changing device relative to the workpiece support. The part-movements can be superimposed on each other.

Since the laser processing head is located above the workpiece support plane during normal machine operation and the nozzle changing device is arranged at the lower side of the workpiece support plane, it can be advantageous to carry out the transfer of laser nozzles between the nozzle magazine of the nozzle changing device and the nozzle receiving member of the laser processing head in a transverse direction of the workpiece support plane. Accordingly, the handling device can be used.

The movement that is intended to be carried out by laser nozzles during the nozzle change in the transverse direction of the workpiece support plane can be brought about in various manners. Nozzle movement is conceivable using only the laser processing head, which in this case is to be lowered sufficiently far below the workpiece support plane. It is further possible to have a nozzle movement that is brought about partially by means of the handling device of the nozzle changing device and partially by means of the laser processing head. In the latter case, the laser processing head may also be to be lowered below the workpiece support plane. The laser processing machine can include a handling device by means of which laser nozzles can be transferred through the workpiece support plane between the nozzle magazine of the nozzle changing device and the nozzle receiving member of the laser processing head. In this case, the nozzle changing operation does not require any movement, or at least only slight movement, of the laser processing head in the transverse direction of the workpiece support plane.

The details of one or more embodiments of the invention are set forth in the accompanying drawings and the description below. Other features and advantages of the invention will be apparent from the description and drawings, and from the claims.

DETAILED DESCRIPTION

Figure 1:
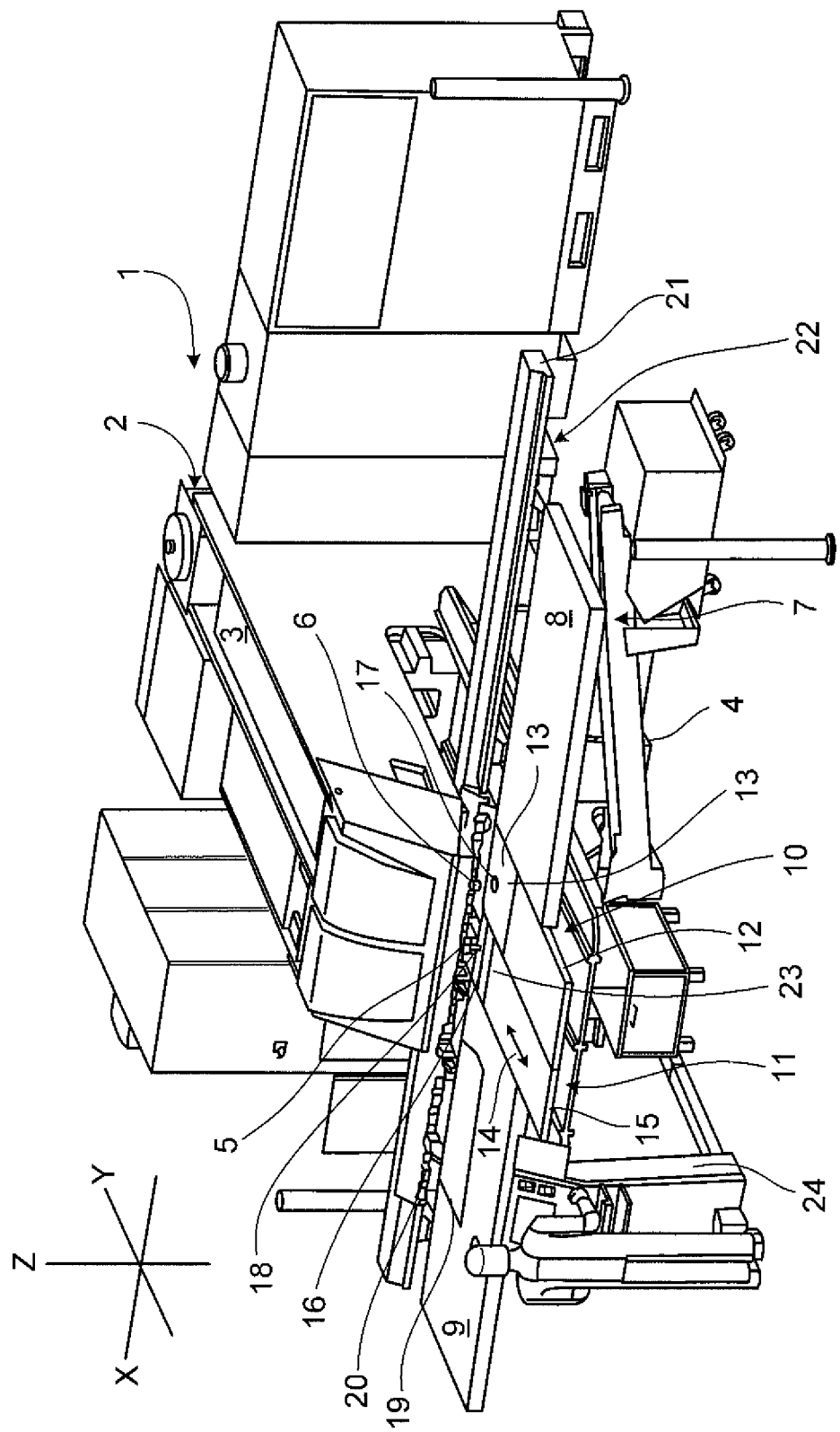
FIG. 1 is a perspective view of a laser processing machine having a laser cutting station and an additional processing station.

According to FIG. 1, a laser processing machine 1 has a machine frame 2 having an upper frame member 3 and a lower frame member 4. A laser processing head in the form of a laser cutting head 5 and, as an additional processing device, a punching head 6 are provided beside each other at the free end of the upper frame member 3. The laser processing machine 1 is accordingly a so-called "combi-machine".

The lower frame member 4 supports a workpiece table 7. Side tables 8, 9 of the workpiece table 7 are guided so as to be movable in a horizontal Y direction on the lower frame member 4. A punching support 10 and a cutting support 11 of the workpiece table 7 are arranged between the side tables 8, 9. The punching support 10 includes a support member 12 that is secured to the frame and a discharge flap 13 that can be pivoted about a horizontal axis. Parts of the cutting support 11 include a workpiece support 15 that can be moved in the direction of a double-headed arrow 14 (that is, along the Y direction) and a double flap 16 that is similar to a trapdoor.

A punching die 17 is integrated in the discharge flap 13 of the punching support 10. The punching die 17 cooperates with the punching head 6 in order to process workpieces. Accordingly, the trapdoor-like double flap 16 of the cutting support 11 is provided with a beam receiving member 18 for the laser beam, which is directed from the laser cutting head 5 towards workpieces to be processed.

A metal sheet 19, which is indicated by way of illustration, is intended to be processed in the laser processing machine 1. The metal sheet 19 is supported on the workpiece table 7. The metal sheet 19 is held in known manner by clamping lugs 20, which are themselves guided so as to be movable in a horizontal X direction on a transverse rail 21 of a coordinate guide system 22 of conventional construction type. The transverse rail 21 of the coordinate guide system 22 is movable together with the side tables 8, 9 in the Y direction. It is possible to move the metal sheet 19 held by the clamping lugs 20 in the X direction relative to the workpiece table 7 by the clamping lugs 20 being moved accordingly in the X direction. In this manner, the coordinate guide system 22 allows positioning of the metal sheet 19 relative to the laser cutting head 5 and the beam receiving member 18 and relative to the punching head 6 and the punching die 17 in the horizontal plane, which is defined by the X direction and the Y direction.

The metal sheet 19 is supported during its movement over the workpiece table 7 in a low-friction manner on brushes, which are not illustrated in detail, of the workpiece table 7. The brushes mentioned are omitted in the region of the punching die 17 at the discharge flap 13 of the punching support 10 and in the region of the beam receiving member 18 at the trapdoor-like double flap 16 of the cutting support 11. The brushes of the workpiece table 7 are further omitted in the region of a through-opening 23, which is visible only schematically in FIG. 1, at the movable workpiece support 15 of the cutting support 11.

All significant functions of the laser processing machine 1 are numerically controlled. For example, a computer numerical control (CNC) unit 24 is provided for that purpose.

As is evident from FIG. 2, a nozzle changing device 26 is fitted to the workpiece support 15 of the cutting support 11 below a workpiece support plane 25, which is defined by the workpiece support 15. The nozzle changing device 26 includes a nozzle magazine 27 that is in the form of a turret magazine according to FIG. 3. A magazine turret 28 can be rotated about a turret rotation axis 30 by means of a drive motor 29, which can be switched in terms of its direction of rotation. A plurality of magazine stations 31 are arranged in succession on the magazine turret 28 in the direction of rotation. One of the magazine stations 31 is constructed as a so-called "dummy station" 32 and has a through-channel 33 that extends in the direction of the turret rotation axis 30. The remaining magazine stations 31 of the magazine turret 28 are provided as nozzle storage locations and, as such, are each provided with a nozzle holder 34. According to FIG. 3, one of the nozzle holders 34 (nozzle holder 34/1) is empty; and in each of the remaining nozzle holders 34, a laser nozzle 35 is arranged. A corresponding laser nozzle 35 can be screwed into a nozzle receiving member 36 of the laser cutting head 5 according to FIG. 2.

Figure 3:
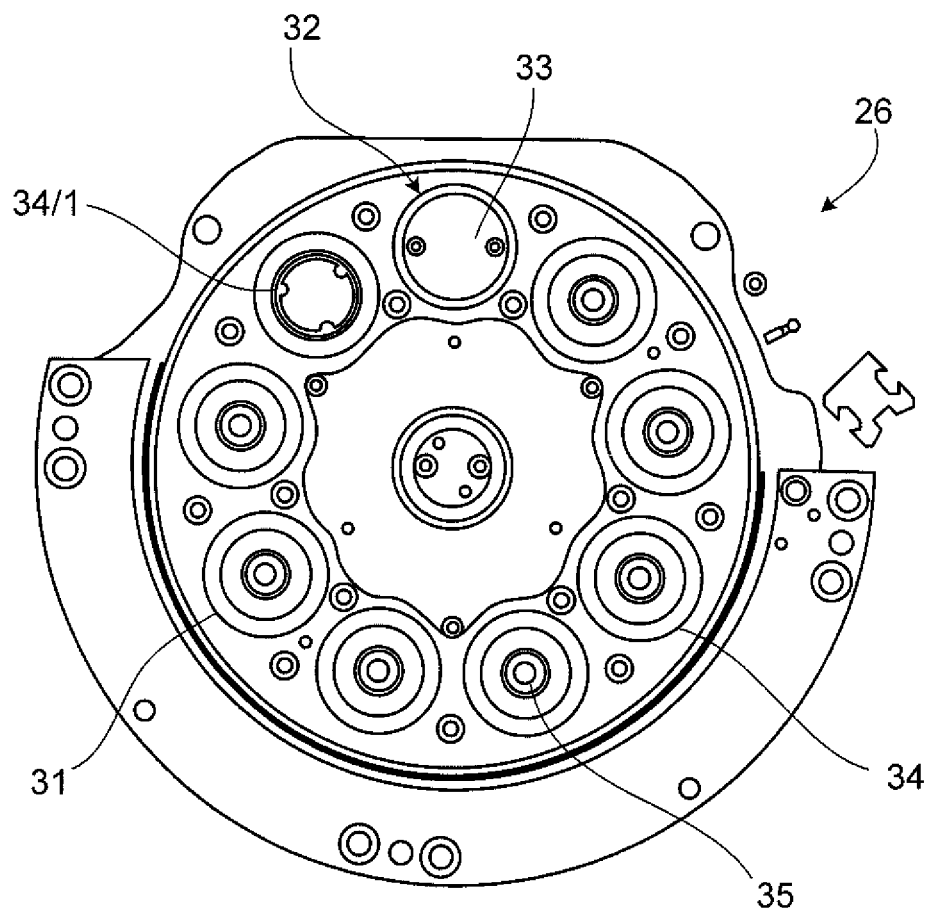
FIG. 3 is a top plan view of the nozzle changing device of FIG. 2 taken along the direction of arrow III in FIG. 2, FIGS. 4-8 are side cross-sectional views illustrating a nozzle changing operation at the laser cutting station according to FIG. 2.
Figure 4:
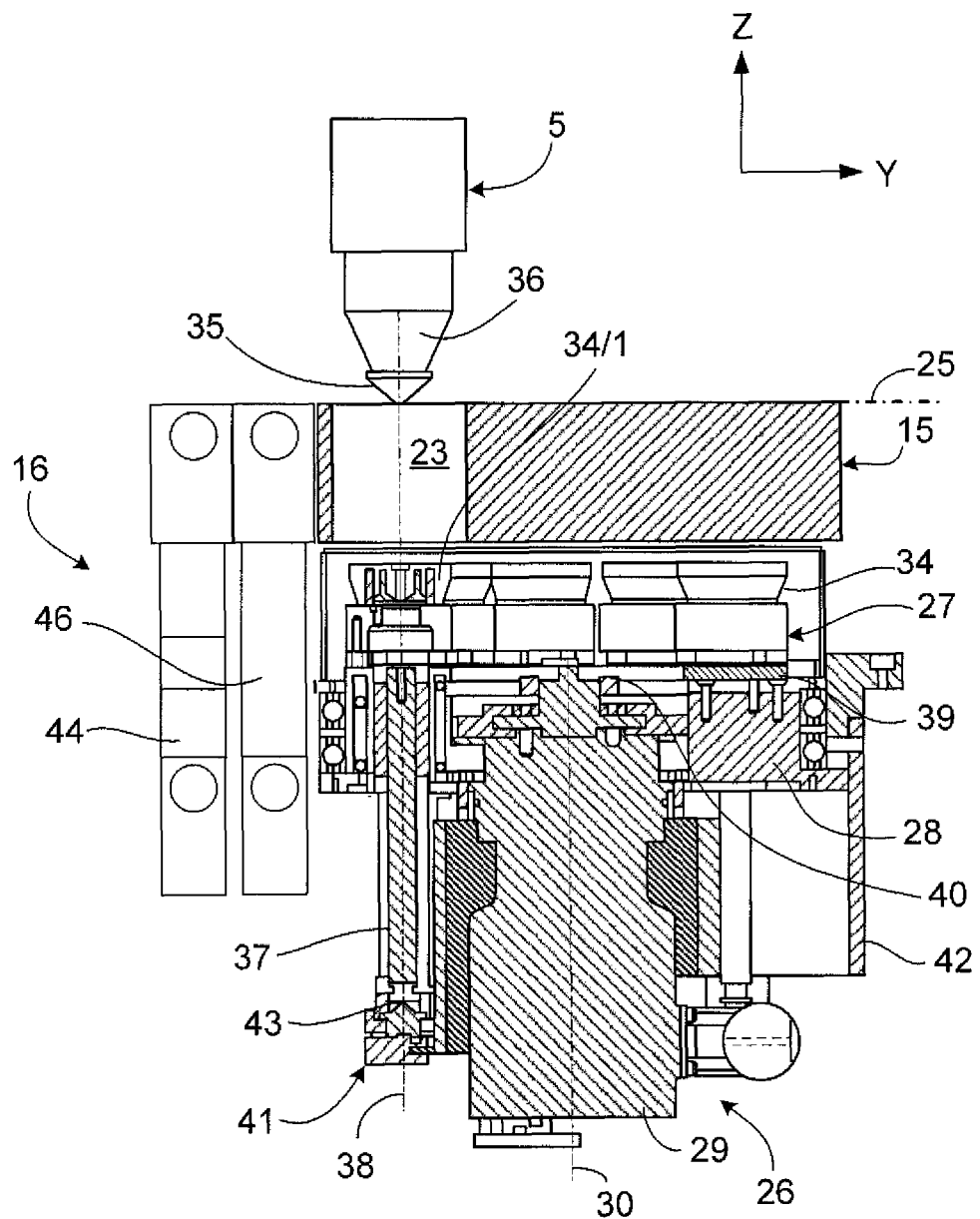

As can be seen, for example, in FIG. 4, each nozzle holder 34 has a shaft 37. This is part of a handling device, by means of which laser nozzles 35 are transferred between the nozzle magazine 27 of the nozzle changing device 26 and the laser cutting head 5 and are assembled on or disassembled from the nozzle receiving member 36 of the laser cutting head 5. Each of the nozzle holders 34 is supported on the magazine turret 28 by means of the shaft 37 so as to be rotatable about a shaft axis 38. In order to drive in rotation a shaft 37 and the nozzle holder 34 that is connected thereto, there is used an externally toothed planet wheel 39 with which a sun wheel 40 that is also toothed externally engages. The sun wheel 40 can be driven by means of the drive motor 29 in mutually opposite directions about the turret rotation axis 30. The planet wheels 39 and the sun wheel 40 are arranged in a concealed manner in FIG. 3.

A lifting device 41 is fitted to a motor housing 42 of the drive motor 29 so as to be rotationally secure relative to the turret rotation axis 30. For the shaft 37 of the nozzle holders 34 it has a shaft receiving member 43 that is open in the direction of rotation of the magazine turret 28. The shaft receiving member 43 can be moved parallel with the shaft axis 38 or the turret rotation axis 30, which extends so as to be aligned therewith by means of a pneumatic piston/cylinder unit that is not illustrated in detail. FIG. 2 shows the relationships at the cutting station of the laser processing machine 1 during normal cutting operation. The trapdoor-like double flap 16 is closed and supports at the upper side thereof, together with the workpiece support 15 and additional components of the workpiece table 7, the metal sheet 19. A frame-side leaf 44 of the trapdoor-like double flap 16 is articulated to the machine frame 2 so as to be pivotable about a pivot axis 45, which is secured to the frame 2. A support-side leaf 46 of the trapdoor-like double flap 16 is connected to the workpiece support 15 of the cutting support 11 so as to be pivotable about a support-side pivot axis 47 as an additional device for discharging products of the workpiece processing operation. The workpiece support 15 is moved, in the direction of the double-headed arrow 14, into a position in which the frame-side leaf 44 and the support-side leaf 46 of the trapdoor-like double flap 16 are spaced apart from each other only slightly. The position of the workpiece support 15 is chosen in accordance with the dimensions of the workpiece components that are intended to be discharged via the trapdoor-like double flap 16. If the workpiece parts that are intended to be discharged have corresponding dimensions, the workpiece support 15 and, with it, the support-side leaf 46 of the trapdoor-like double flap 16 can be arranged so as to be displaced to the right in FIG. 2. A motorized support drive 48, which is indicated in FIG. 2, is used to bring about the positioning movement of the workpiece support 15 in the direction of the double-headed arrow 14 (that is, along the Y direction) and therefore relative to the laser cutting head 5.

During normal cutting operation, the laser cutting head 5 is arranged with the laser nozzle 35 above the beam receiving member 18, which is provided at the frame-side leaf 44 of the trapdoor-like double flap 16. The nozzle changing device 26 is located with the dummy station 32 below the through-opening 23 in the workpiece support 15. Accordingly, the through-channel 33 of the dummy station 32 is aligned with the through-opening 23 of the workpiece support 15. Contaminations, for example, slag or metal splashes that occur during the processing operation for cutting the sheet metal, can fall from the upper side of the workpiece support 15 through the through-opening 23 of the workpiece support 15 and the associated through-channel 33 of the dummy station 32 and can thereby leave the operating region of the laser processing machine 1 under the action of gravitational force.

In known manner, the laser beam used as the cutting tool is directed through the laser nozzle 35 of the laser cutting head 5 towards the metal sheet 19 that is intended to be processed. Cutting gas is further supplied through the laser nozzle 35 in the direction towards the processing location of the laser beam on the metal sheet 19.

The laser nozzle 35 on the laser cutting head 5 is to be changed for a laser nozzle 35 from the nozzle magazine 27 of the nozzle changing device 26, for example, when the material to be processed changes or when the material thickness to be processed changes, or also for reasons of wear and/or contamination. An interruption in the processing operation for cutting the workpiece is generally used for changing the nozzle. At the time of the nozzle change, no workpiece is arranged on the upper side of the cutting support 11.

Figure 2:
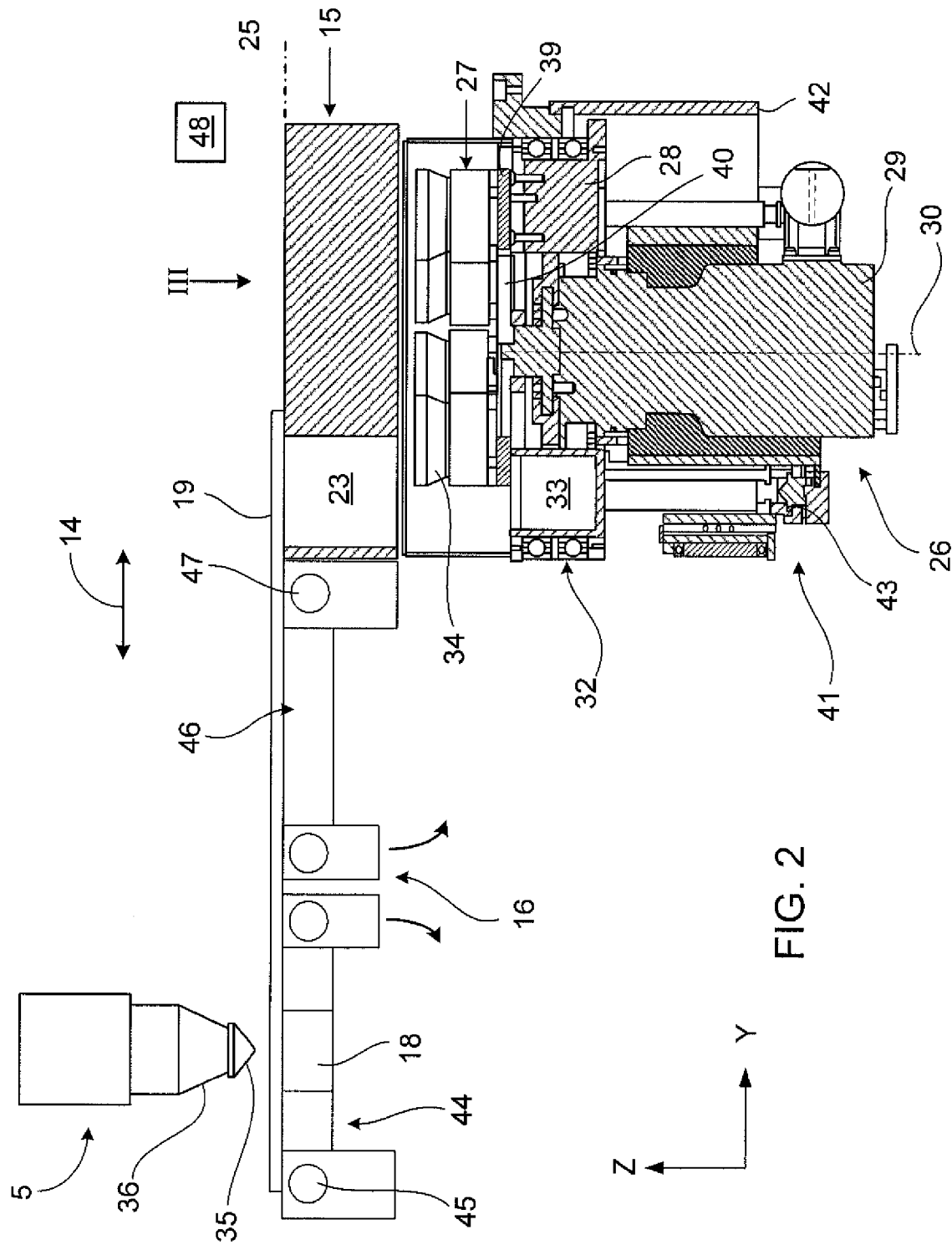
FIG. 2 is a partial side cross-sectional view of a laser cutting station of a first construction type having a nozzle changing device.

In order to change the nozzle, starting from the situation according to FIG. 2, the frame-side leaf 44 and the support-side leaf 46 of the trapdoor-like double flap 16 are pivoted downwards in the opening direction until they are orientated vertically. Subsequently, the workpiece support 15 and the opened support-side leaf 46 of the trapdoor-like double flap 16 are moved to the left (along the Y direction) in FIG. 2 by means of the support drive 48 until the support-side leaf 46 is moved directly beside the frame-side leaf 44 of the trapdoor-like double flap 16. This is associated with a movement of the nozzle changing device 26 out of the park position according to FIG. 2 into the (nozzle) changing position.

If the workpiece support 15 has reached its end position in the direction of movement, the laser cutting head 5 is arranged with the laser nozzle 35 that is to be changed above the through-opening 23 of the workpiece support 15. In the embodiment illustrated, the laser cutting head 5 is lowered in a vertical direction (along the Z direction) until the tip of the laser nozzle 35 that is mounted on the laser processing head 5 is located at the height of the workpiece support plane 25.

At the same time as the positioning movement of the workpiece support 15, the magazine turret 28 is rotated about the turret rotation axis 30 at the nozzle changing device 26 on the lower side of the workpiece support 15 until the empty nozzle holder 34/1 takes up a position below the through-opening 23 of the workpiece support 15 and consequently faces in the changing position the laser nozzle 35 that is intended to be changed. The drive motor 29 that is connected to the magazine turret 28 for this purpose serves to adjust the magazine turret 28 in a rotational manner as described.

Owing to the rotational movement of the magazine turret 28, the shaft 37 that is provided on the empty nozzle holder 34 is introduced into the shaft receiving member 43 of the lifting device 41. The relationships according to FIG. 4 therefore result.

Figure 5:
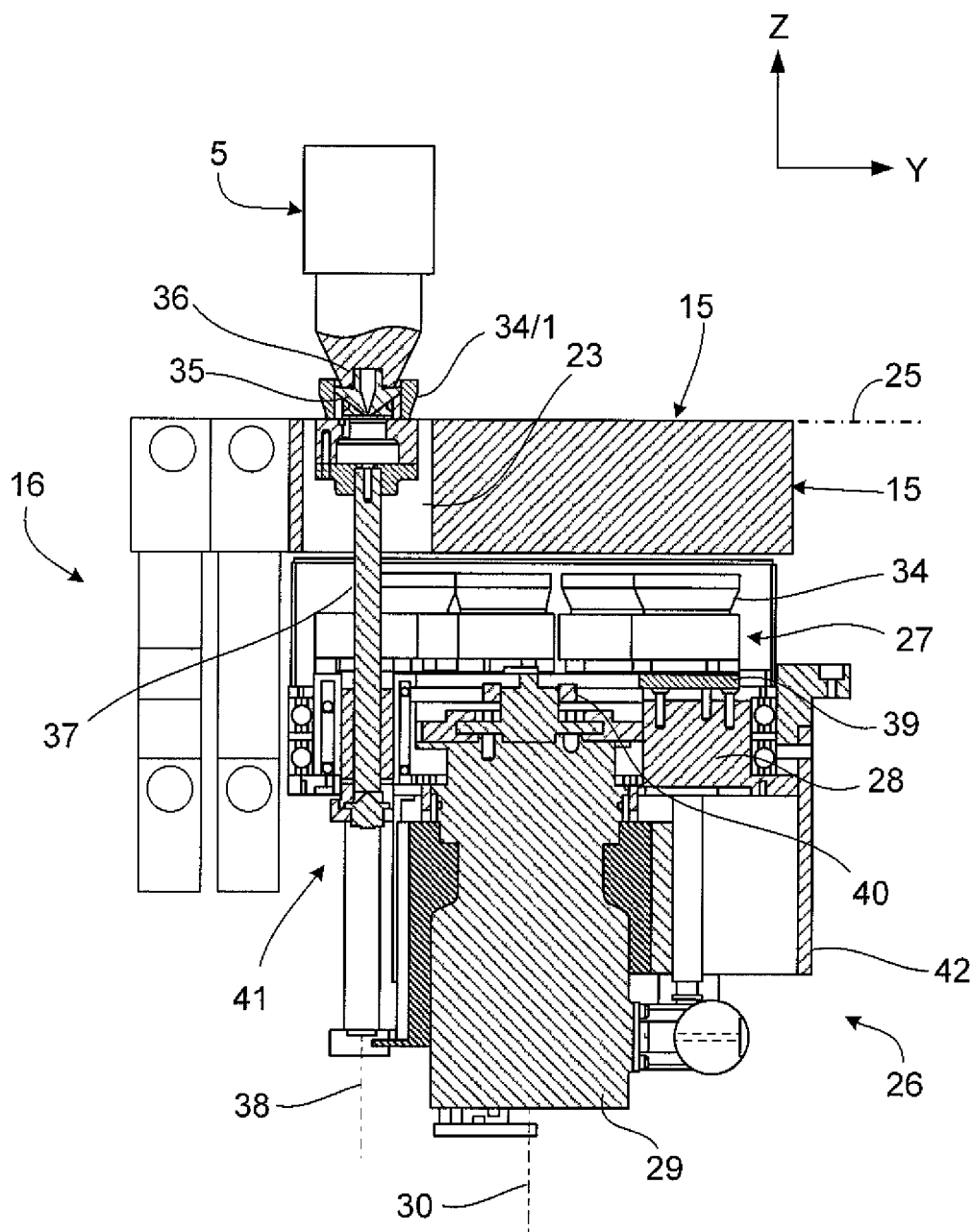

In this operating state of the nozzle changing device 26, the lifting device 41 is actuated and the empty nozzle holder 34/1 moves upwards through the through-opening 23 of the workpiece support 15 until it surrounds the laser nozzle 35 that is intended to be changed (FIG. 5).

Figure 6:
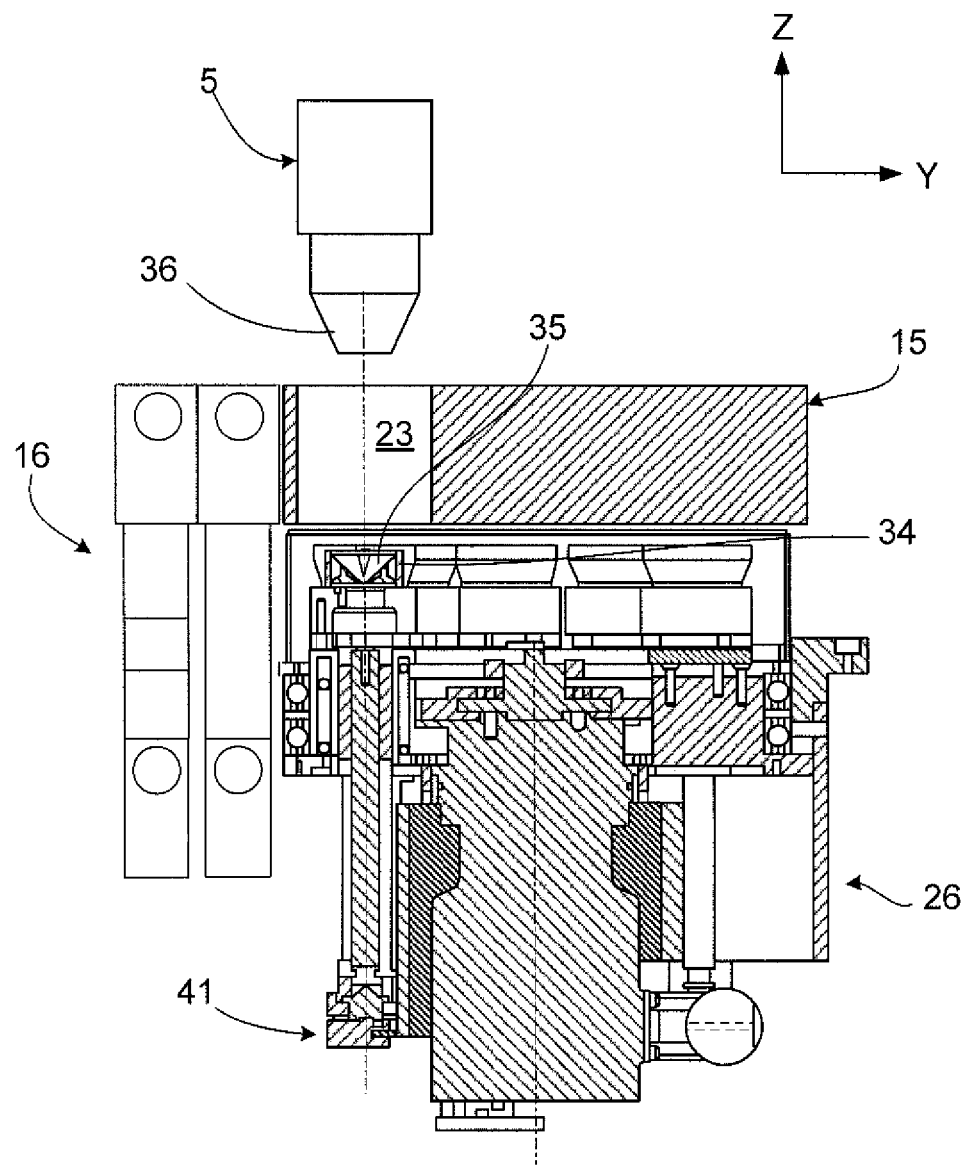

In the meantime, the connection between the drive motor 29 and the magazine turret 28 of the nozzle changing device 26 has been disengaged and the magazine turret 28 has been temporarily arrested in its current rotational position. The drive motor 29 is started with the connection being disengaged. The drive motor 29 drives inter alia the planet wheel 39, which is associated with the upwardly displaced shaft 37, about the shaft axis 38 by means of the sun wheel 40. Owing to a form-fitting connection between the planet wheel 39 and the upwardly displaced shaft 37, the shaft 37 and the nozzle holder 34 that is provided thereon are driven about the shaft axis 38 with the laser nozzle 35 located therein. The direction of rotation of the drive motor 29 is chosen so that there is produced at the nozzle holder 34 that is displaced upwards a direction of rotation, by means of which the laser nozzle 35 that is intended to be changed is unscrewed out of the nozzle receiving member 36 of the laser cutting head 5. The laser nozzle 35 is carried in the direction of rotation by the nozzle holder 34 owing to corresponding shaping of the outer periphery of the laser nozzle 35, on the one hand, and the inner periphery of the nozzle holder 34, on the other hand. After the laser nozzle 35 that is intended to be changed has been released, the upwardly displaced nozzle holder 34 is lowered into its start position below the workpiece support 15 together with the laser nozzle 35 that has been taken up by it with corresponding actuation of the lifting device 41 (FIG. 6).

Figure 7:
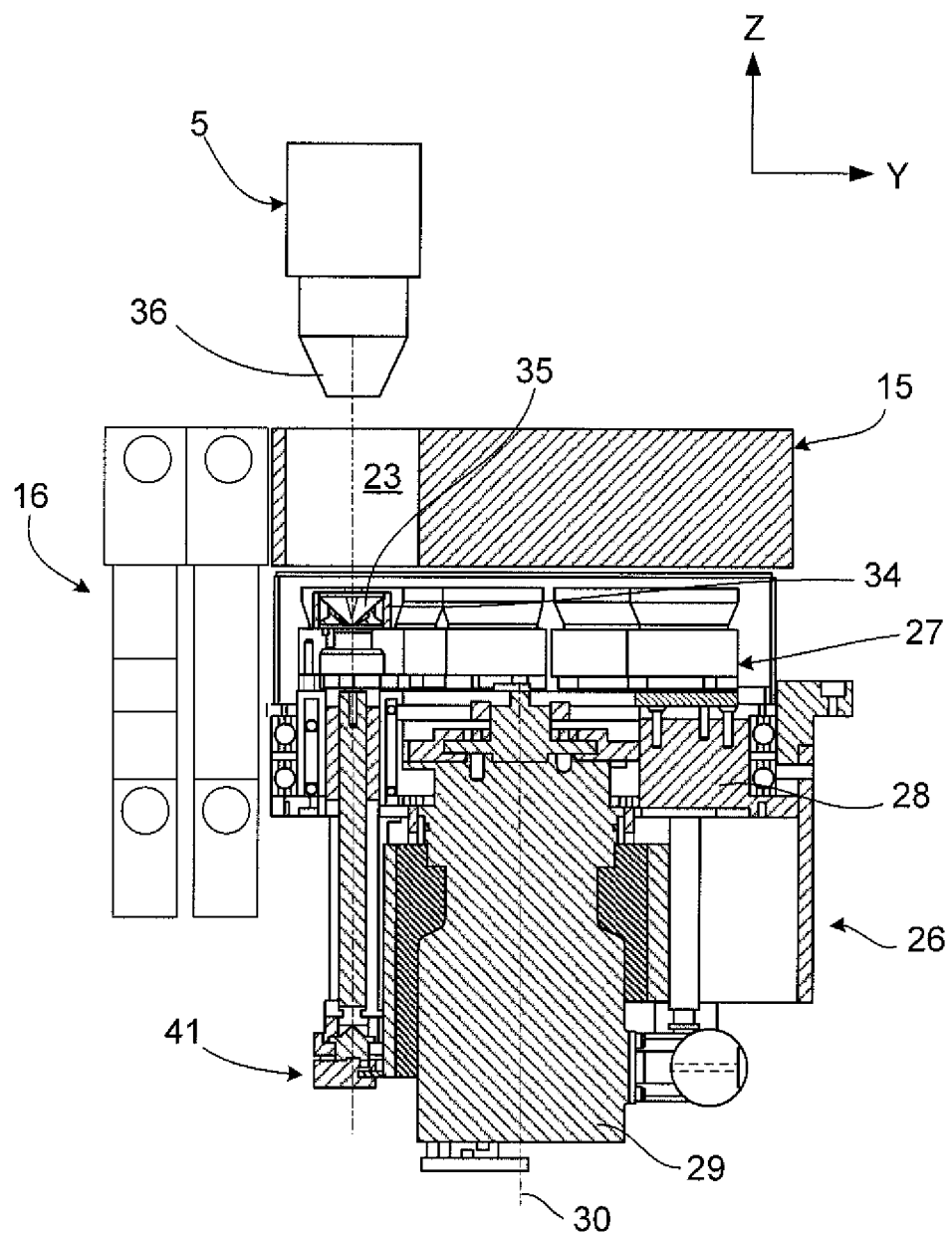
Figure 8:
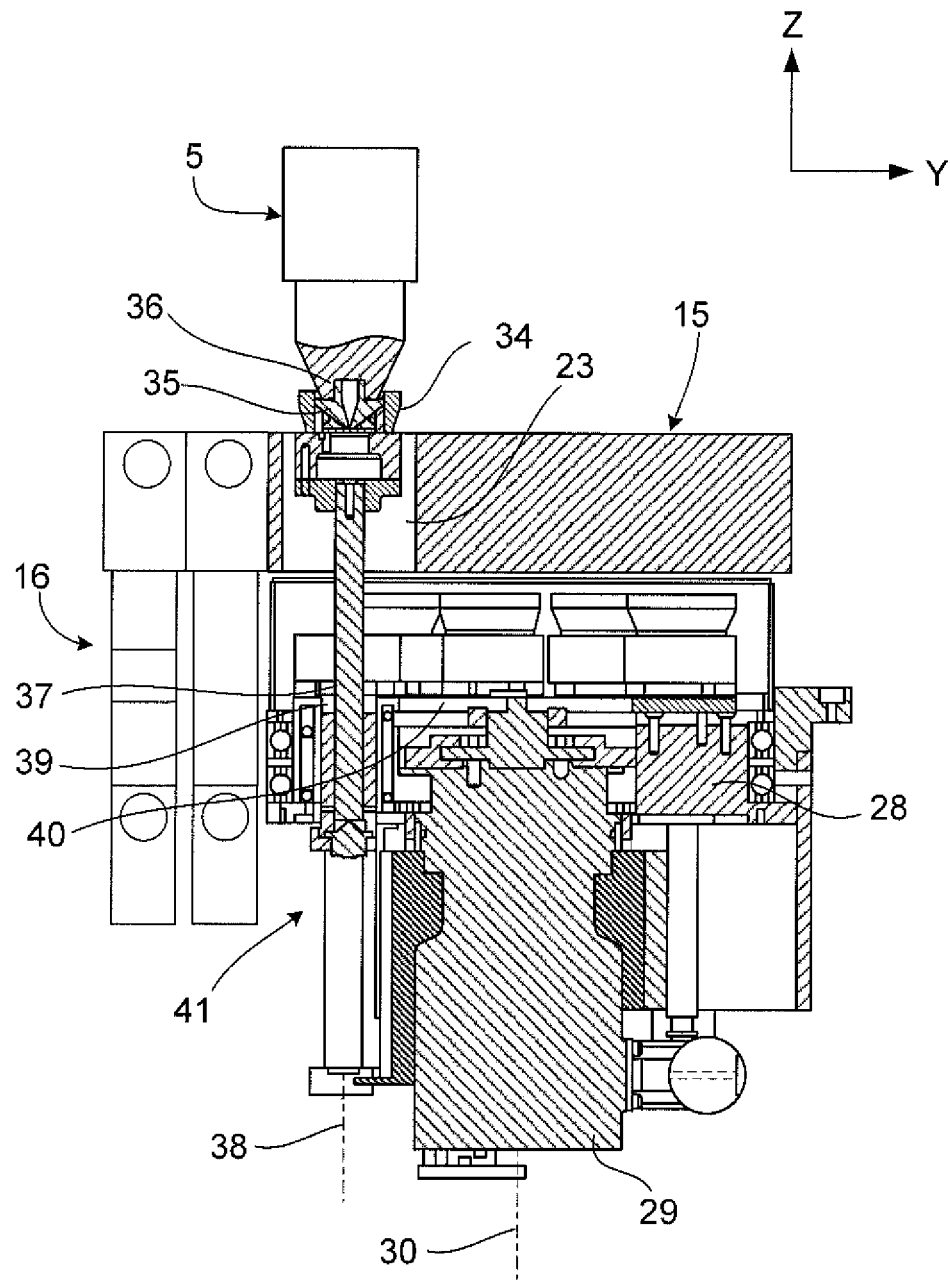

Subsequently, the magazine turret 28 of the nozzle magazine 27 is unlocked in its direction of rotation and is again connected to the drive motor 29 of the nozzle changing device 26. The magazine turret 28 is then rotated about the turret rotation axis 30 by means of the drive motor 29 until another nozzle holder 34 (which, for example, can be directly adjacent to the nozzle holder 34 with the disassembled laser nozzle 35 in the direction of rotation) that has a new laser nozzle 35 is arranged below the through-opening 23 of the workpiece support 15 (FIG. 7). Subsequently, the lifting device 41 is actuated again. Consequently, the nozzle holder 34 moves upwards with the new laser nozzle 35 from its position according to FIG. 7. The laser nozzle 35 inside the nozzle holder 34 that has been moved upwards is positioned with the end of the threaded projection thereof located in the direction towards the laser cutting head 5 on the lower end of the nozzle receiving member 36 on the laser cutting head 5. The threaded projection of the laser nozzle 35 is resiliently supported in the direction of the shaft axis 38 on the edge of the nozzle receiving member 36 of the laser cutting head 5. If the magazine turret 28 is again arrested in the direction of rotation and is disconnected from the drive motor 29 of the nozzle changing device 26, and if the drive motor 29 is operated with a corresponding direction of rotation, the nozzle holder 34 that has been displaced upwards is rotated about the shaft axis 38 by means of its shaft 37 and by means of the planet wheel 39 thereof and the sun wheel 40. As a result of that rotational movement, the threaded projection of the laser nozzle 35 that is applied to the laser cutting head 5 is screwed into the nozzle receiving member 36. The movement in an axial direction (that is, along the Z direction) that is intended to be carried out by the laser nozzle 35 during the screwing action into the nozzle receiving member 36 is brought about by the resilient force action of the laser nozzle 35 acting in that direction. After a predetermined number of rotations, the laser nozzle 35 is fixed in the nozzle receiving member 36 of the laser cutting head 5 (FIG. 8). The drive motor 29 is stopped before the now-empty nozzle holder 34 is moved downwards by the lifting device 41 being actuated and, as a result, there is produced a situation that corresponds to the situation according to FIG. 4.

After the magazine turret 28 has been unlocked in the direction of rotation and after a drive connection has been produced between the magazine turret 28 and the drive motor 29 of the nozzle changing device 26, the drive motor 29 of the nozzle changing device 26 is actuated and thereby the magazine turret 28 is moved about the turret rotation axis 30 into a rotation position, in which the dummy station 32 is again located below the through-opening 23 of the workpiece support 15. At the same time as the rotational adjustment of the magazine turret 28, the workpiece support 15 moves in the direction of the double-headed arrow 14 (that is, along the Y direction) out of the position illustrated in FIG. 8 and into the position illustrated in FIG. 2. Finally, the trapdoor-like double flap 16 is closed by pivoting the frame-side leaf 44 and the support-side leaf 46 and the laser processing head is lifted in the direction of the Z axis into its start position. The cutting station of the laser processing machine 1 is therefore again in the operational state provided for the processing operation for cutting the workpiece according to FIG. 2. The nozzle changing device 26 takes up its park position again with respect to the laser cutting head 5.

The arrangement according to FIGS. 9-15 can be provided in the laser processing machine 1 in place of the arrangement according to FIGS. 2-8. Corresponding reference numerals are associated with mutually corresponding components.

Figure 9:
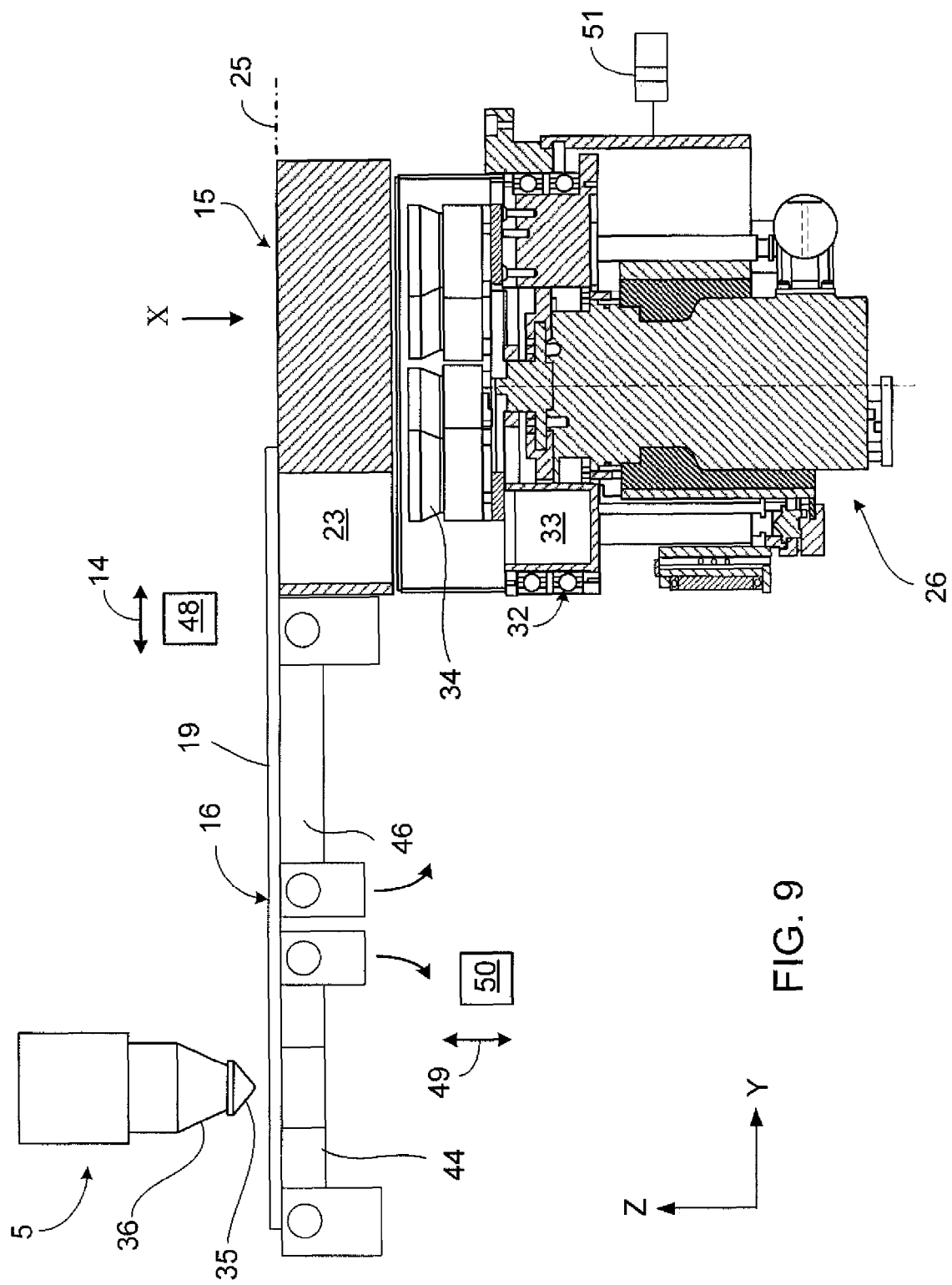
FIG. 9 is a partial side cross-sectional view of a laser cutting station of a second construction type having a nozzle changing device.
Figure 10:
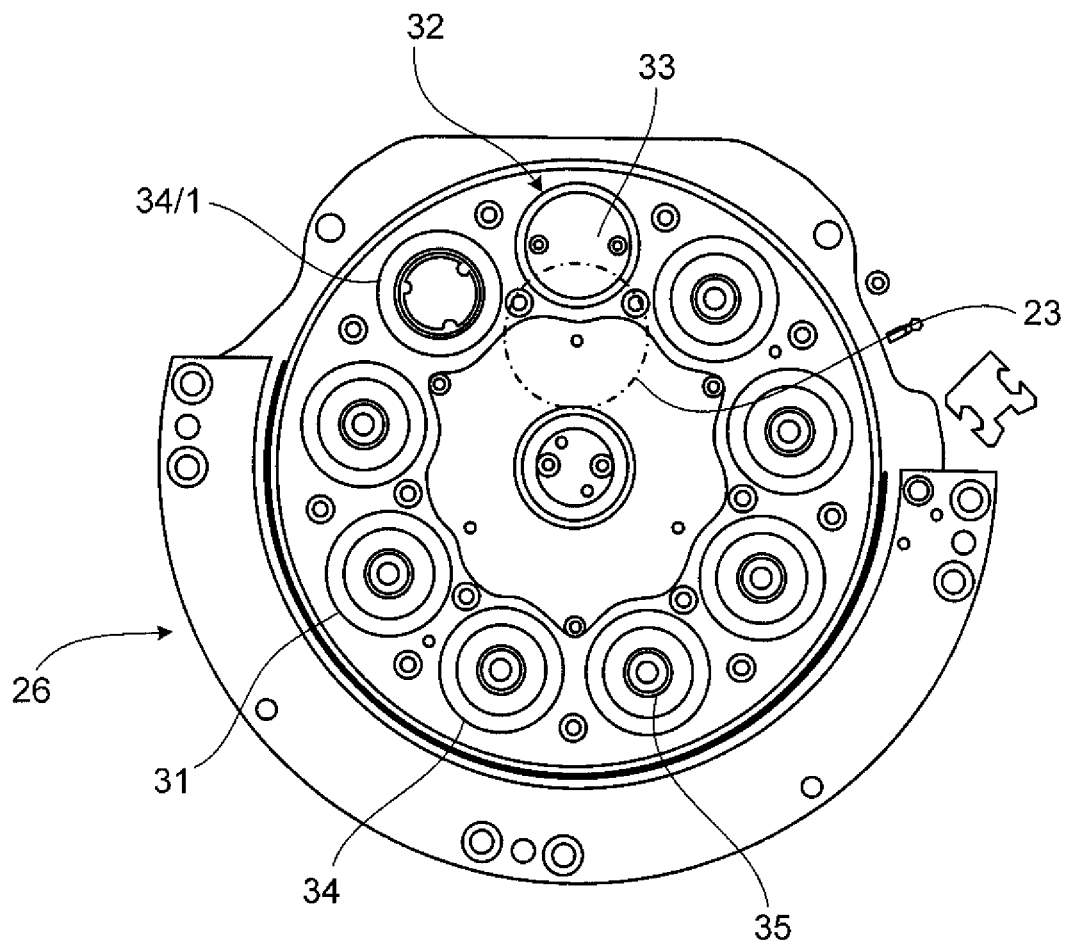
FIG. 10 is a top plan view of the nozzle changing device of FIG. 9 in the direction of arrow X in FIG. 9, and FIGS. 11-15 are side cross-sectional views illustrating a nozzle changing operation at the laser cutting station according to FIG. 9.

Unlike the above-described relationships, according to FIGS. 9-15 the trapdoor-like double flap 16 is movable in the opened state relative to the workpiece support 15 in a vertical direction (double-headed arrow 49 in FIGS. 2 and 9, or the Z direction). The support-side leaf 46 of the trapdoor-like double flap 16 (as indicated with dot-dash lines in FIG. 9) is further connected to the nozzle changing device 26 and, together therewith, can be moved relative to the workpiece support 15 in the direction of the double-headed arrow 14 (along the Y direction). Consequently, the workpiece support 15 can travel over the trapdoor-like double flap 16 and can thereby position the nozzle changing device 26 that is guided on the workpiece support 15 particularly far to the left towards the laser processing head 5 starting from the relationships according to FIG. 2.

A vertical positioning drive 50, which is indicated in FIG. 9, is used to adjust the height of the trapdoor-like double flap 16. The support-side leaf 46 of the trapdoor-like double flap 16 and the nozzle changing device 26 are moved relative to the workpiece support 15 in a horizontal direction (for example, the Y direction) by means of a horizontal positioning drive 51, which is similarly indicated in FIG. 9.

FIG. 9 shows the relationships during normal cutting operation. The trapdoor-like double flap 16 is closed and is aligned at its upper side with the upper side of the workpiece support 15. The nozzle changing device 26, which is arranged below the workpiece support 15, takes up its park position relative to the laser cutting head 5 and is in the operational state according to FIG. 10. Accordingly, the nozzle changing device 26 is positioned relative to the workpiece support 15 in such a manner that the dummy station 32 of the nozzle magazine 27 is arranged so as to be displaced in the direction of the double-headed arrow 14 relative to the through-opening 23 of the workpiece support 15. The cross-section of the through-opening 23 in the workpiece support 15 and the cross-section of the through-channel 33 in the dummy station 32 partially overlap. Occurrences of contamination that occur during cutting operation, for example, slag or metal splashes, can pass through the through-opening 23 of the workpiece support 15 under the action of gravitational force and then either reach the upper side of a cover (not shown in detail) of the nozzle changing device 26 or directly pass through the through-channel 33 of the dummy station 32 downwards.

In order to change a nozzle on the laser cutting head 5, first the trapdoor-like double flap 16 is opened and, in the opened state, is lowered below the workpiece support 15 by means of the vertical positioning drive 50. Subsequently, the support-side leaf 46 of the trapdoor-like double flap 16 and the nozzle changing device 26 are moved together in a horizontal (Y) direction relative to the workpiece support 15 by means of the horizontal positioning drive 51. The leaf 46 of the trapdoor-like double flap 16 and the nozzle changing device 26 are moved to the right relative to the workpiece support 15 out of the position according to FIG. 9 into the position according to FIG. 11. At the end of that positioning movement, first the dummy station 32 of the nozzle magazine 27 is located with its entire cross-section within the cross-section of the through-opening 23 in the workpiece support 15. Occurrences of contamination that have previously become deposited on the upper side of the cover of the nozzle changing device 26 are brushed off the cover by the edge of the through-opening 23 in the workpiece support 15 during the movement carried out by the nozzle changing device 26 relative to the workpiece support 15, and thereby reach the region of the opening of the through-channel 33 in the dummy station 32. Under the action of gravitational force, those occurrences of contamination are then discharged downwards, through the through-channel 33 of the dummy station 32, out of the operating region of the laser processing machine 1. The laser cutting head 5 is lowered in a vertical direction (along the Z direction) out of the position according to FIG. 9 into the position according to FIG. 11. The tip of the laser nozzle 35 on the laser cutting head 5 is now at the height of the workpiece support plane 25.

Even during the relative movement of the support-side leaf 46 of the trapdoor-like double flap 16 and the nozzle changing device 26, on the one hand, and the workpiece support 15, on the other hand, the workpiece support 15 is moved to the left starting from the position according to FIG. 9, together with the support-side leaf 46 of the trapdoor-like double flap 16 and the nozzle changing device 26 by means of the support drive 48, until the through-opening 23 of the workpiece support 15 is located below the laser cutting head 5 and the nozzle changing device 26 takes up its changing position under the laser nozzle 35 that is intended to be disassembled. In a concurrent manner with respect to this movement, the magazine turret 28 of the nozzle magazine 27 is rotated about the turret rotation axis 30 by the drive motor 29 until the empty nozzle holder 34/1 of the nozzle magazine 27 is arranged below the through-opening 23 of the workpiece support 15. This results in the situation according to FIG. 11.

Figure 11:
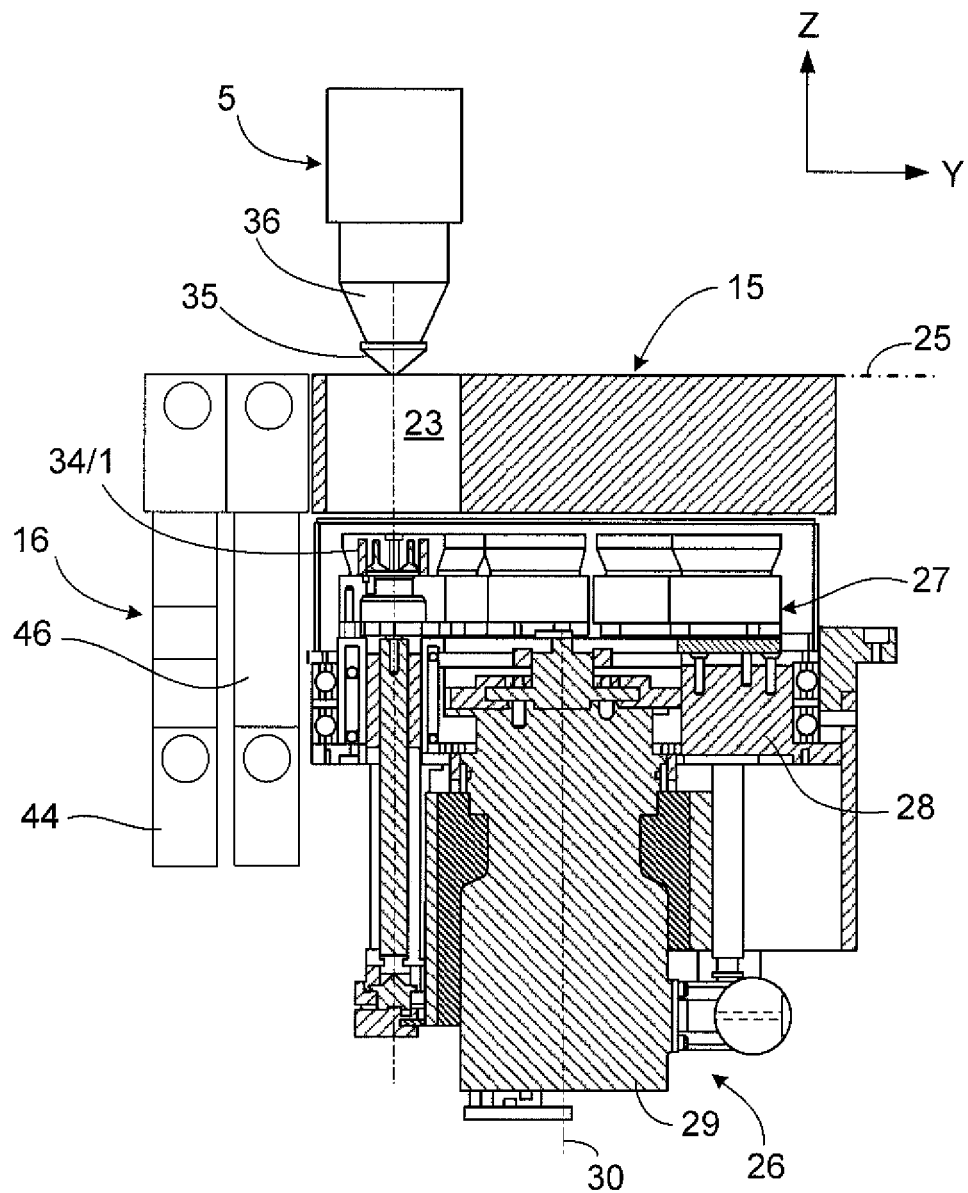
Figure 12:
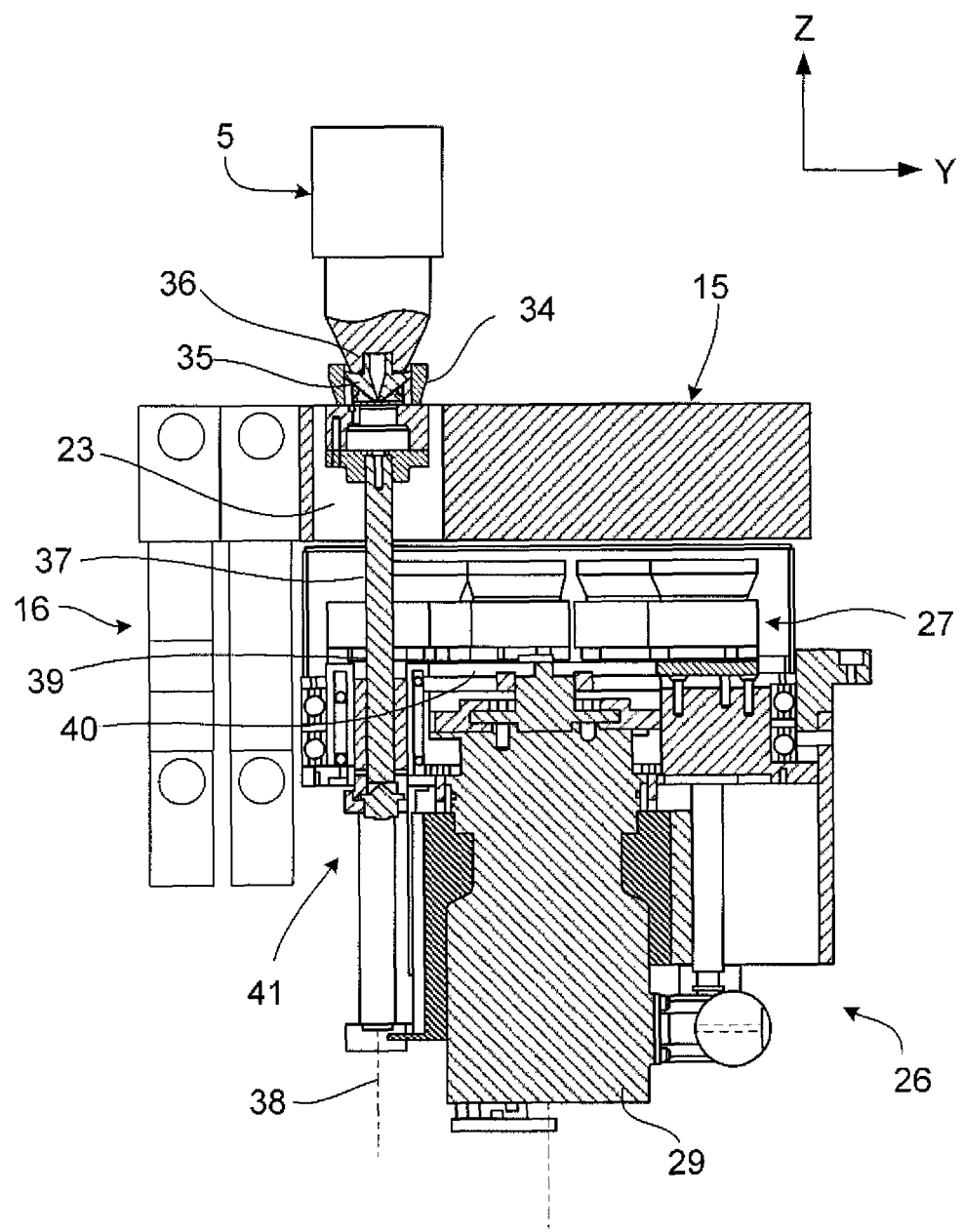
Figure 13:
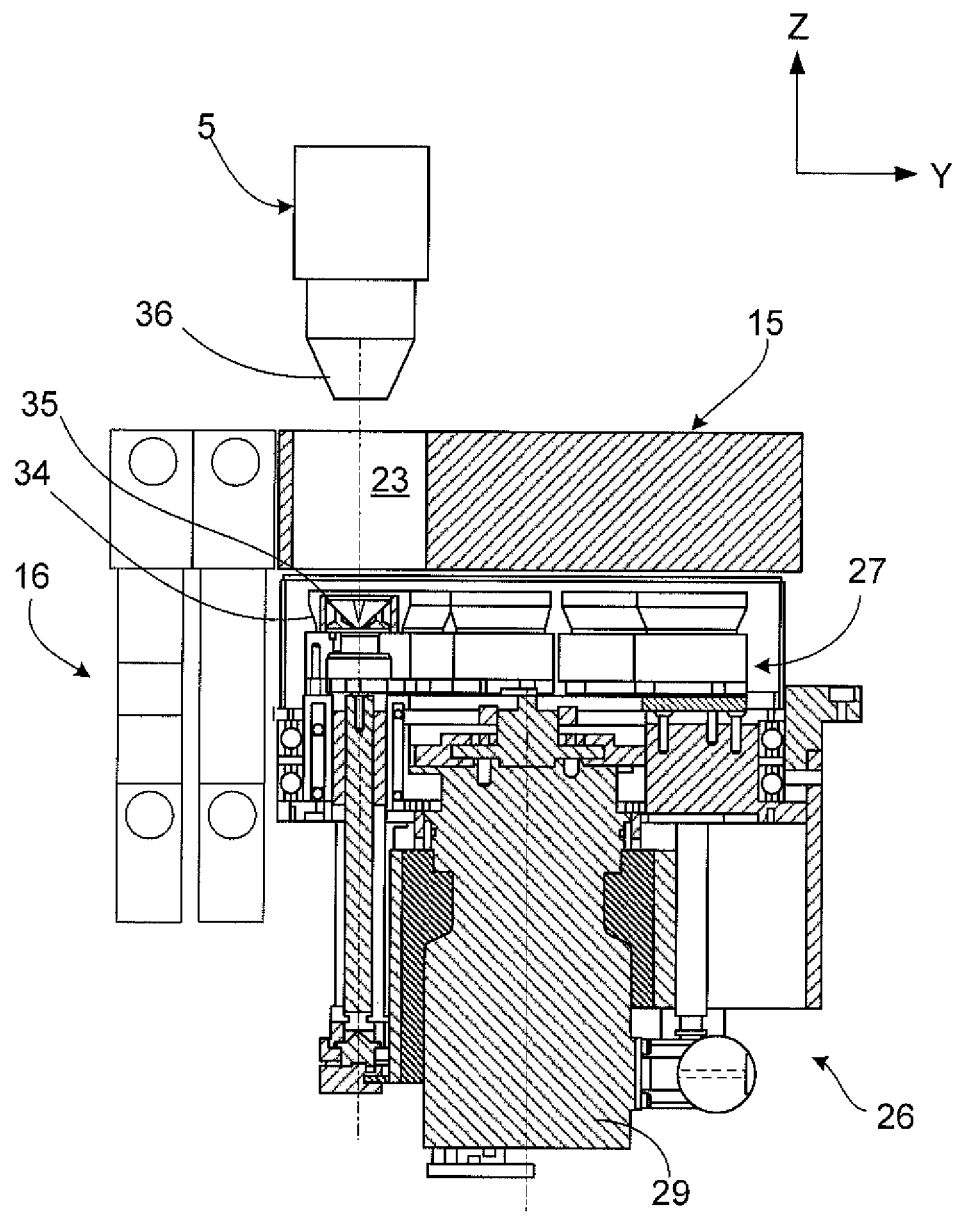
Figure 14:
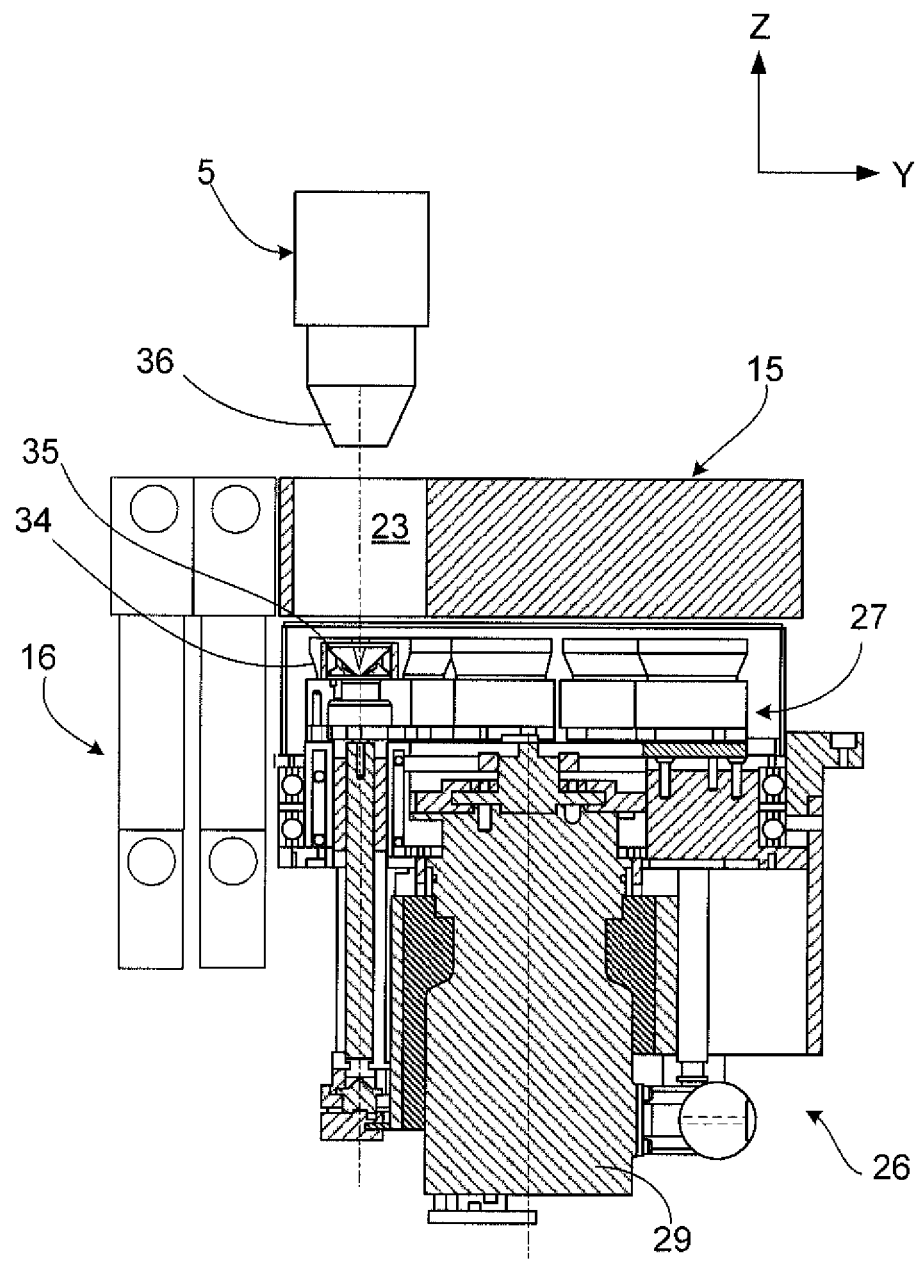
Figure 15:
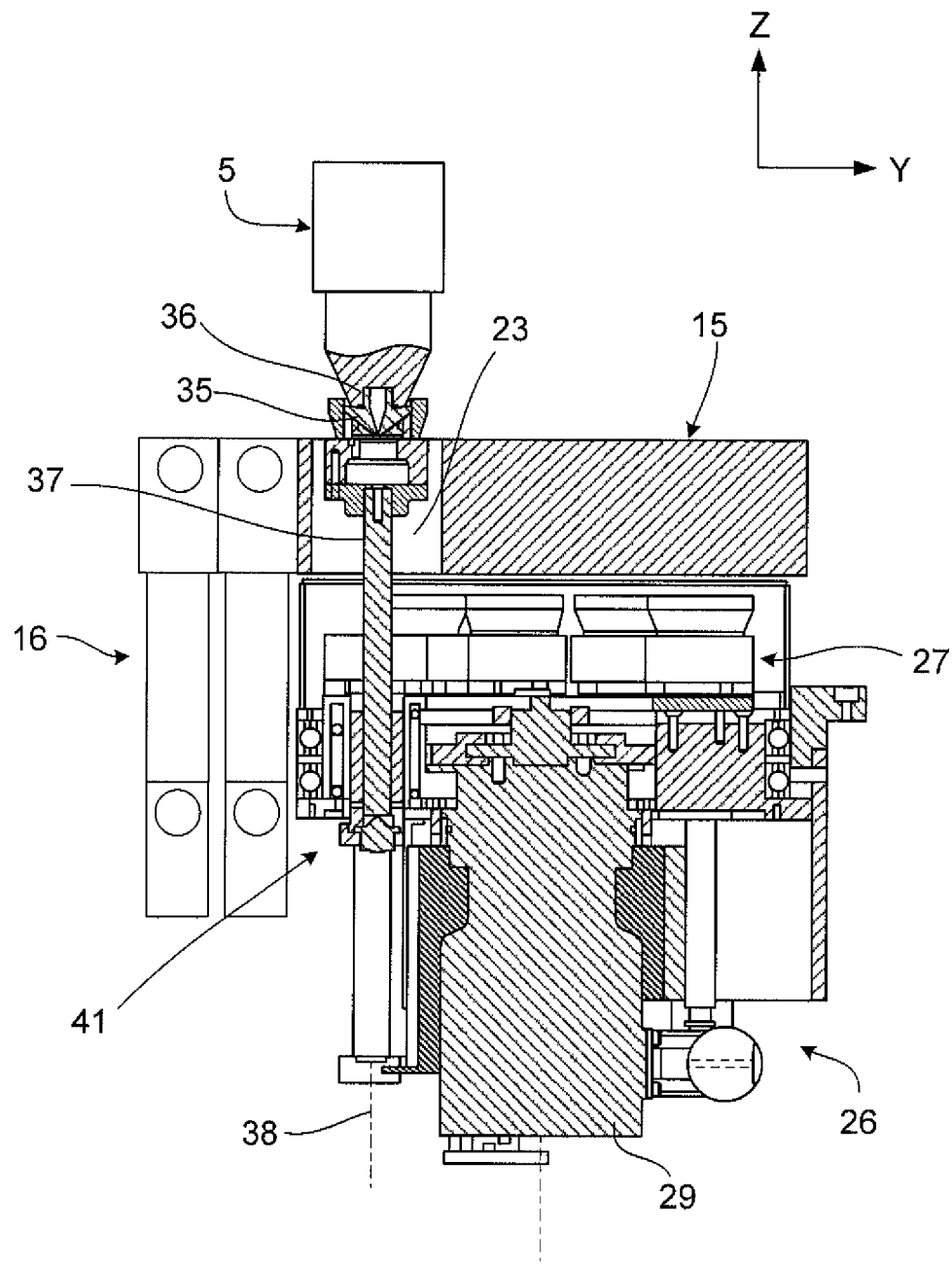

Based on the relationships according to FIG. 11, the nozzle changing operation is carried out (as shown in FIGS. 12-15) as previously described with reference to FIGS. 4-8. After the nozzle changing operation has been completed, the relationships according to FIG. 9 are reproduced by moving the workpiece support 15 relative to the laser cutting head 5, moving the support-side leaf 46 of the trapdoor-like double flap 16 and the nozzle changing device 26 relative to the workpiece support 15 and by lifting and closing the trapdoor-like double flap 16 and lifting the laser cutting head 5.

Both in the case of the sequences according to FIGS. 2-8 and in the case of the sequences according to FIGS. 9-15, in addition to the workpiece support 15, the laser cutting head 5 can be positioned in the direction of the double-headed arrow 14 with corresponding movability, and thereby take over a portion of the positioning movement necessary in this direction between the laser cutting head 5 and the nozzle changing device 26.

OTHER EMBODIMENTS

A number of embodiments have been described. Nevertheless, it will be understood that various modifications may be made without departing from the spirit and scope of the invention. Accordingly, other embodiments are within the scope of the following claims.

What is claimed is:

1. A method for processing workpieces with a laser processing machine including a laser processing head having a nozzle receiving member configured to receive a laser nozzle, the method comprising:
   holding a workpiece on a workpiece support plane of a workpiece support;
   transferring a laser nozzle between a nozzle magazine of a nozzle changing device located at a first side of the workpiece support and a nozzle receiving member of the laser processing head located at a second side of the workpiece support such that the laser nozzle is assembled on or disassembled from the nozzle receiving member; and
   moving the laser nozzle through a through-opening defined in the workpiece support along a transverse direction to the workpiece support.

2. The method of claim 1, further comprising transferring the laser nozzle between the nozzle magazine of the nozzle changing device and the nozzle receiving member of the laser processing head.

3. The method of claim 1, further comprising:
   moving the workpiece support and the laser processing head relative to each other; and
   moving the nozzle changing device relative to the laser processing head into one or more of a changing position and a park position by moving the workpiece support and the laser processing head relative to one another.

4. The method of claim 1, further comprising jointly moving the workpiece support and the nozzle changing device relative to the laser processing head such that the nozzle changing device is moved into one or more of a changing position and a park position relative to the laser processing head by the movement of the workpiece support.

5. The method of claim 1, further comprising moving the nozzle changing device into one or more of a changing position and a park position by a support drive of the workpiece support, the support drive being capable of moving the workpiece support relative to the laser processing head together with a device for discharging products of the workpiece processing operation.

6. The method of claim 1, further comprising connecting the nozzle changing device to the workpiece support.

7. The method of claim 1, further comprising moving the nozzle changing device relative to the workpiece support.

8. The method of claim 1, further comprising transferring a laser nozzle along a transverse direction to the workpiece support plane between the nozzle magazine of the nozzle changing device and the nozzle receiving member of the laser processing head.

9. The method of claim 1, further comprising transferring a laser nozzle through the workpiece support plane between the nozzle magazine of the nozzle changing device and the nozzle receiving member of the laser processing head.

* * * * *